(No Model.)
T. A. EDISON.
INCANDESCENT ELECTRIC LAMP.
No. 341,644. Patented May 11, 1886.
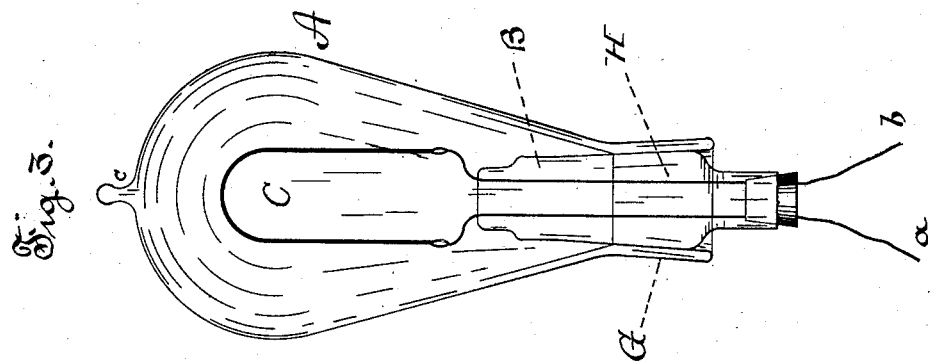
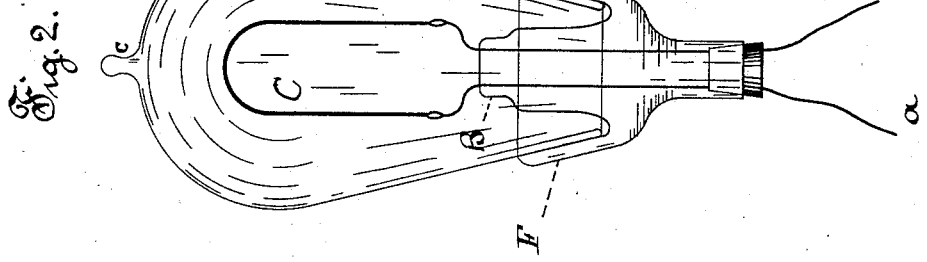
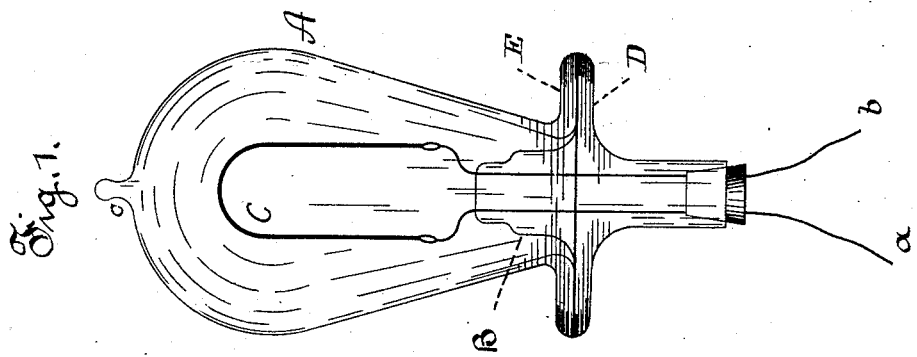
Attest:
D. D. Mott
H. W. Seely.
Inventor:
T. A. Edison
per Dyer & Wilber
Attys.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

INCANDESCENT ELECTRIC LAMP.

SPECIFICATION forming part of Letters Patent No. 341,644, dated May 11, 1886.

Application filed May 31, 1881. Serial No. 34,652. (No model.)

*To all whom it may concern:*

Be it known that I, THOMAS A. EDISON, of Menlo Park, in the county of Middlesex and State of New Jersey, have invented a new and useful Improvement in Electric Lamps; and I do hereby declare that the following is a full and exact description of the same, reference being had to the accompanying drawings, and to the letters of reference marked thereon.

The object I have in view is to produce a simple method and means for sealing incandescent electric lamps, so that when the carbons are destroyed the lamps can be taken apart, supplied with new carbons, and again exhausted and sealed at a less cost than the first expense of manufacture. This I accomplish by providing the glass-support for the filament of each lamp with a sufficiently large ground surface with which fits closely a ground surface of similar size on the globe or bulb, one or both of the surfaces being, if necessary, first covered with a viscous substance, which fills the interstices and makes an air-tight joint. The lamp is exhausted, as usual, and the pressure of the atmosphere holds the surfaces together, the viscid substance requiring no packing to hold it in place.

As just stated, the lamp is made in two glass parts secured together by a ground glass joint aided by atmospheric pressure. The wires leading to the incandescing conductor are sealed into one of the glass parts of the lamp by the fusion of the glass around and upon such wires. For the incandescing conductor there is employed a carbon filament—viz., a conductor of carbon of filamentary size and having consequently a high resistance, which permits of the use of small leading-in wires, which can be successfully sealed into the glass without danger of breaking the seal at such points.

The lamp-globe, it will be understood, is exhausted by connection with suitable vacuum apparatus, and is "sealed off" from connection with the vacuum apparatus by the fusion of a glass tube extending from one glass part of the lamp.

The lamp produced is separate from the vacuum apparatus, and has each of its two glass parts formed of a continuous glass piece by the fusion of the glass, the only point in the glass globe where the glass is not fused into one piece being at the ground surfaces where the two parts meet.

In the drawings, Figure 1 is an elevation of one form of the lamp embodying my invention, and Figs. 2 and 3 elevations of other forms.

A is the glass globe or bulb. B is the glass-support for the filament; $a$ $b$, the leading-in wires, and C the incandescing carbon filament.

In Fig. 1 the glass-support B is shown as provided with a solid horizontal flange, D, which is ground on its upper surface, while the bulb A, at its lower end, is turned outwardly to form a horizontal flange, E, which is ground on its under surface and fits closely the upper surface of the flange D. Before the bulb A is exhausted the carbon is inserted into the same and the ground surfaces of flanges D E brought together, one or both of such surfaces being first rubbed with a viscid substance—such as bird-lime, paraffine, or liquid rubber or grease. The bulb is then exhausted, as usual, and sealed off at $c$ by the fusion of the glass.

In Fig. 2 the glass-support has an upturned cup-flange, F, and the lower end, G, of the bulb is fitted inside of the same, the meeting surfaces being ground. A viscid substance is used in the joint, as before explained. The end, G, of the bulb may be fitted over the cup F, if desired.

In Fig. 3 the lower end, G, of the bulb is fitted over the tapering body H of the glass-support. When the carbon is broken the globe may be used over again. It is opened by breaking off the sealing-teat $c$, allowing the air to rush into the vacuum. The globe can then be separated at the joint. A new exhausting-tube is sealed on where $c$ is broken off, a new carbon filament is connected with the wires, and the globe is exhausted and again sealed.

What I claim is—

1. A separate incandescent electric lamp consisting of an exhausted glass inclosing-chamber made in two parts, each of which is formed of a continuous glass piece by the fusion of the glass, the two parts being provided with ground meeting or junction surfaces aided in their adhesion by atmospheric pressure, and an incandescing carbon filament secured to leading-in wires passing through one of the parts and sealed by fusion into the glass thereof, substantially as set forth.

2. A separate incandescent electric lamp consisting of an exhausted glass inclosing-chamber made in two parts, each of which is formed of a continuous glass piece by the fusion of the glass, the two parts being provided with ground meeting or junction surfaces covered with a viscid substance and aided in their adhesion by atmospheric pressure, and an incandescing carbon filament secured to leading-in wires passing through one of the parts and sealed by fusion into the glass thereof, substantially as set forth.

3. A separate incandescent electric lamp consisting of an exhausted glass inclosing-chamber made in two parts, each of which is formed of a continuous glass piece by the fusion of the glass, the two parts being provided with ground meeting or junction surfaces aided in their adhesion by atmospheric pressure, and one of such parts having the sealing-teat $c$, and an incandescing carbon filament secured to leading-in wires passing through one of the parts and sealed by fusion into the glass thereof, substantially as set forth.

This specification signed and witnessed this 20th day of May, 1881.

THOMAS A. EDISON.

Witnesses:
RICHD. N. DYER,
H. W. SEELY.